United States Patent
Eschmann et al.

(10) Patent No.: US 6,957,280 B2
(45) Date of Patent: Oct. 18, 2005

(54) STREAMLINING ATA DEVICE INITIALIZATION

(75) Inventors: Michael K. Eschmann, Folsom, CA (US); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/841,590

(22) Filed: May 6, 2004

(65) Prior Publication Data

US 2004/0210681 A1 Oct. 21, 2004

Related U.S. Application Data

(62) Division of application No. 09/675,873, filed on Sep. 29, 2000, now Pat. No. 6,779,062.

(51) Int. Cl.[7] ............................. G06F 13/28; G06F 3/00
(52) U.S. Cl. ................................. 710/3; 710/5; 710/22; 710/20
(58) Field of Search ........................... 710/3–5, 20, 22, 710/23, 26, 62, 74, 72, 52, 56

(56) References Cited

U.S. PATENT DOCUMENTS

| | | |
|---|---|---|
| 5,313,626 A | 5/1994 | Jones et al. |
| 5,649,230 A | 7/1997 | Lentz |
| 5,701,450 A | 12/1997 | Duncan |
| 5,841,722 A | 11/1998 | Willenz |
| 5,905,885 A | 5/1999 | Richter et al. |
| 5,920,709 A | 7/1999 | Hartung et al. |
| 6,081,849 A | 6/2000 | Born et al. |
| 6,098,114 A | 8/2000 | McDonald et al. |
| 6,330,626 B1 | 12/2001 | Dennin et al. |
| 6,490,635 B1 | 12/2002 | Holmes |
| 2001/0021951 A1 | 9/2001 | Kimura et al. |

OTHER PUBLICATIONS

Ultra DMA Modes, http://www.pcguide.com/ref/hdd/if/ide/modesUDMA–c.html, no date.*
Direct Memory Access (DMA) Modes and Bus Mastering DMA, http://www.pcguide.com/ref/hdd/if/ide/modesDMA–c.html, no date.*

* cited by examiner

Primary Examiner—Kim Huynh
(74) Attorney, Agent, or Firm—Blakely, Sokoloff, Taylor & Zafman LLP

(57) ABSTRACT

The invention includes a platform having a controller coupled to a central processing unit through a system bus. The platform also includes a register device coupled between the central processing unit and the controller. Moreover, the platform also includes a bus coupled to the controller having an end that is adapted to receive a device. The register device includes a depth that is adapted to hold all instruction packets from the central processing unit without presenting delays due to full conditions.

6 Claims, 4 Drawing Sheets

STREAMLINING ATA DEVICE INITIALIZATION

The application is a divisional of U.S. patent application Ser. No. 09/675,873, filed Sep. 29, 2000 now U.S. Pat. No. 6,779,062.

BACKGROUND OF THE INVENTION

1. Field of the Invention

The invention may include input/output data processing organization of an information processing system having an advanced technology attachment (ATA) interface controller. Particularly, the invention may include peripheral configuration initialization through a shadow register space.

2. Background Information

The central processing unit (CPU) of a host computer system may be that part of a computer which controls all the other parts. The CPU fetches instructions from a memory local to the CPU and decodes these instructions to produce signals which control the other part of the computer. This may cause the CPU to transfer data between memory and an arithmetic and logic unit (ALU) or to cause external devices or peripherals to perform input or output services. An example of a peripheral is a hard disk drive.

To cause a hard disk drive to perform input or output services, the CPU may initialize the hard disk drive so as to prepare the hard disk drive to receive operation commands. To initialize the hard disk drive, the CPU may transmit as a data packet one or more task-file initialization commands to the hard disk drive through what is called the task-file register set. Each task-file initialization command takes a length of time to execute. One reason for this is that each command execution is verified by the CPU before the next command may be executed.

Conventionally, the CPU dedicates a block of its processing time to the initialization of a peripheral. During this peripheral initialization dedication time, the CPU is prevented from performing other processing functions. In this way, the CPU performance is slowed down.

DETAILED DESCRIPTION OF THE INVENTION

Figure 1:
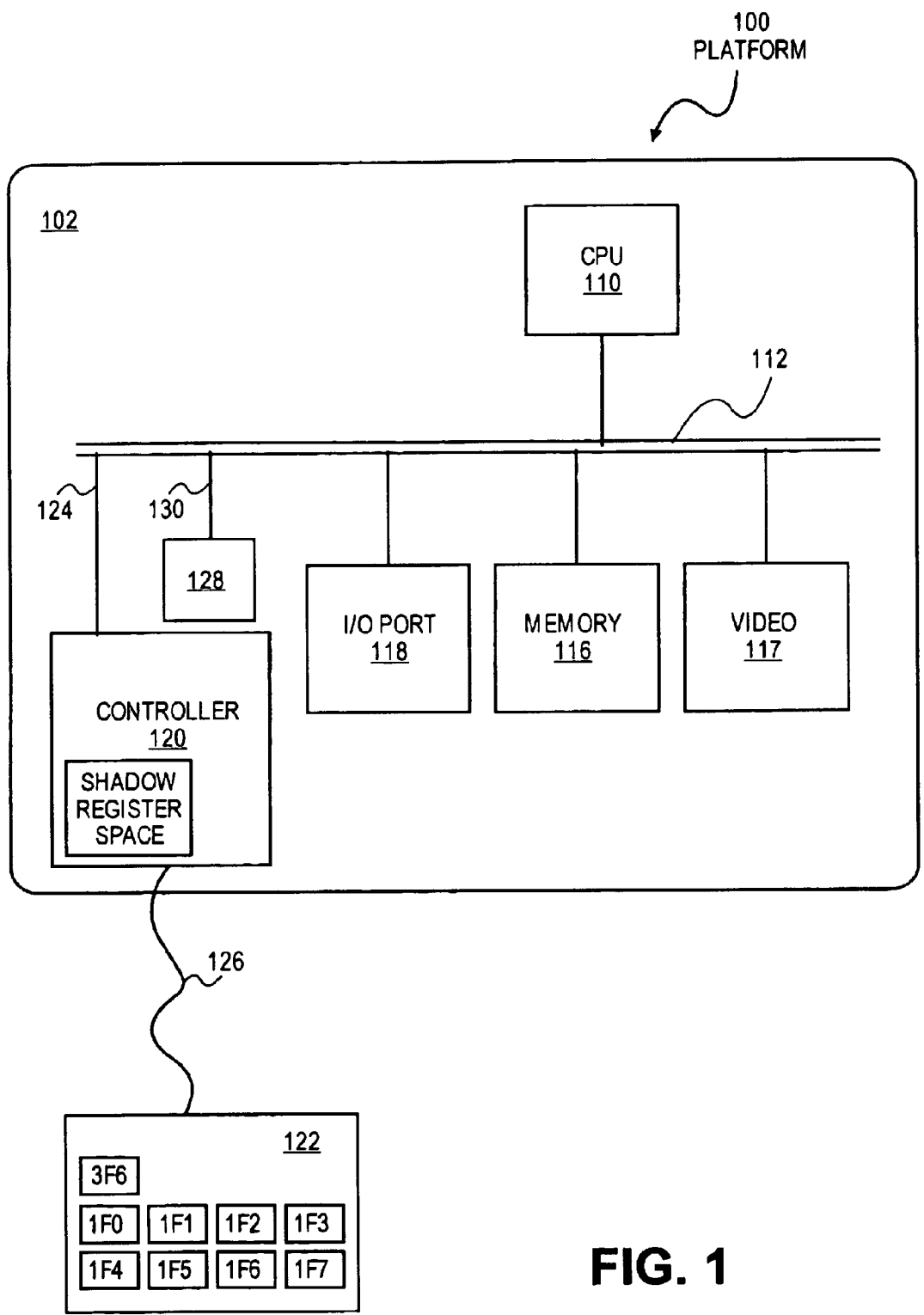
FIG. 1 is a block diagram of platform 100 of the invention.

As more fully developed below, register device 128 of FIG. 1 may be employed to handle initialization completion notification, unlike conventional techniques which employ a central processing unit (CPU) to handle initialization completion notification. With register device 128, the present invention works towards reducing the time a CPU may dedicate to initializing an ATA device.

Most personal and mobile computers employ an industry standard that spells out the power and data signal interface communications between a storage device and the CPU of a computer. One popular set of industry standards is the advanced technology attachment standard. Sometimes written as AT attachment (ATA) or integrated drive electronics (IDE), this set of standards is produced by Technical Committee T13 (www.t13.com) of the National Committee on Information Technology Standards (www.NCITS.org), Washington, D.C.

AT Attachment Interface for Disk Drives (ANSI X3.221-199x) is a disk drive interface standard that specifies the logical characteristics of the interconnecting signals between host systems and storage devices as well as the protocols and commands for the storage device operation. This standard permits compatibility between host system products and storage device products that comply with the standard, even where these products are produced by different manufacturers.

A controller may be thought of as a device that controls the transfer of data from one device to a peripheral device and vice versa. Conventionally, an ATA interface controller may be disposed between an ATA device (such as a hard disk drive) and the CPU. The ATA interface controller may serve as a translator to facilitate the CPU/ATA device communications over each input/output (I/O) cycle. For example, on receiving a command from the CPU such as an initialization command, the ATA interface controller presents the command into something the downstream ATA device will understand, i.e. that the ATA device can handle, and sends this command to the attached ATA device. On receiving the converted command, the ATA device may process the command and may send back a completion notification to the CPU through the ATA interface controller. This conventional input/output (I/O) cycle from command sent to completion notification is a single task-file register access that may take approximately 1.2 microseconds ($\mu$S—one millionth ($10^{-6}$) of a second).

Transmitting information to an ATA device may involve several individual actions (or "writes") to the task-file register set, each of which conventionally may be processed in a 1.2 $\mu$S I/O cycle. For example, where seven individual initialization actions are processed by an ATA interface controller, the total I/O cycle time may be 8.4 $\mu$S (=7×1.2). The collective of these seven writes may be thought of as a task-file. The action of the CPU in performing a series of commands or input/output (I/O) accesses to properly enable an ATA device for the transfer of data may be referred to as "writing the task-file."

During the time in which the ATA interface controller device sends a task-file I/O, the CPU is blocked from generating further commands or receiving further requests. Under current ATA standards, the CPU would be tied up for 8.4 $\mu$S on sending a command to an ATA device with seven individual I/O task-file writes. To put this wait into perspective, a one gigahertz CPU may execute about 1,000 ordinary instructions in one microsecond. Thus, in the 8.4 $\mu$S a CPU dedicates to ATA device initialization, up to 8,400 ordinary instructions (=1,000×8.4) could be processed by the CPU if the time a CPU dedicates to ATA device command setup is reduced.

By employing a shadow register space to handle task-file I/O completion, the present invention works towards reducing the time a CPU may dedicate to command setup of an ATA device by approximately 7.0 $\mu$S: from 8.4 $\mu$S to approximately 1.4 $\mu$S. Moreover, the invention similarly may be employed towards reducing the time a CPU may dedicate to the operation of devices internal and external to a CPU. Therefore, in a "full condition," i.e. when a task-file register is written and a CPU must wait until the I/O cycle out to the ATA device is completed, the register space allows the extension in the ATA interface controller that is described in this invention to complete the I/O cycle to the ATA device. Thus allowing the CPU to return to processing other tasks, such as task-file writes.

FIG. 1 is a block diagram of platform 100 of the invention. Platform 100 may be associated with any system having a CPU. For example, platform 100 may be associated with a desk top computer, a main frame, a radio, a television, a mobile computer, such as a laptop, a satellite system, or other electronic device that processes information.

Platform 100 may include motherboard 102. Motherboard 102 may be the main board of a computer. Moreover, motherboard 102 may contain circuitry for a CPU, a keyboard, and a monitor as well as include slots to accept additional circuitry. Included with motherboard 102 may be CPU 110, system bus 112, video card 114, memory 116, input/output (I/O) port 118, and controller 120. Coupled to controller 120 may be storage device 122.

CPU 110 may be that part of platform 100 which controls all the other parts by executing software instructions. System bus 112 may be one of a set of conductors (wires, printed circuit board tracks or connections in an integrated circuit) connecting the various functional units on motherboard 102. For example, each of video card 114, memory 116, I/O port 118, and controller 120 may be coupled to CPU 110 through system bus 112. As shown in FIG. 1, controller 120 may be coupled to system bus 112 through bus 124 and coupled to storage device 122 through bus 126.

Video card 114 may be a circuit board having the necessary video memory and other electronics to provide a bitmap display to a monitor. Memory 116 may be any storage device that works towards holding data in machine-readable format. I/O port 118 may facilitate communications between CPU 110 and input devices (not shown), such as a keyboard, mouse, touch screen, joystick, digitizing tablet, and microphone.

Controller 120 may be a device that acts as a communications translator between CPU 110 and storage device 122. Controller 120 may include logic that runs protocol instructions out onto bus 126. In one embodiment, controller 120 may be an ATA interface controller.

Storage device 122 may be any device that may require translation of CPU instructions and may employ information stored in a location that may be connected with platform 100. Storage device 122 may be a disk drive that may be adapted to read and write at least one rigid magnetic data storage disk (hard disk) that rotates about a central axle.

Bus 124 may be a 16-bit bus. One skilled in the art will recognize that bus 124 may have more throughput, such as a 32-bit Peripheral Component Interconnect (PCI) bus. Bus 126 may be a first channel having a ATA ribbon cable, one end connected to storage device 122 as an ATA device, such as a master device, and the other end connected to a second ATA device, such as a slave device. Each ribbon cable may be a 44/80 conductor cable or any suitable conductor cable. A secondary channel similar to bus 126 may be coupled to controller 120 so as to serve a second pair of master and slave devices.

To transfer data within platform 100 in a meaningful manner, a method may be needed to uniquely identify the source and destination of the transfer. This identification may be made using an address, much like the postal address of a house or business mailbox. With respect to platform 100, such a scheme may be referred to as addressing.

Each device, such as a memory integrated circuit, storage device 122, or CPU 110, may have its own local address space. An address space may be the range of addresses that a processor or process can access, or at which a device can be accessed.

The address space of a device bus may be dependent upon at least the width of the address; that is, the number of bits in the address. A device bus having an address width of 16 bits uniquely identifies $2^{16}$ or exactly 65,536 locations. The size of a processor's address space depends on the width of the processor's address bus and address registers. Each local address space may start at zero. Each local address may be mapped to a range of addresses which starts at some base address in the processor's address space. Similarly, each process will have its own address space, which may be all or a part of the processor's address space.

Address space may be divided into memory address space and I/O address space. In operation, CPU 110 may communicate with the components of platform 100 through memory address space, I/O address space, or a combination of memory address space and I/O address space.

In a standard microprocessor's architecture, the 0-FFFF$_{hex}$ range of the I/O address space includes 65,535 address locations (=15*16^3+15*16^2+15*16^1+15*16^0) (sometimes referred to as 64K). Mapped over this address range may be the devices of platform 100 that employ I/O address space. Conventionally, a CPU would initialize and access a storage device through I/O address space. As discussed more fully below, CPU 110 uniquely employs memory address space to initialize and access storage device 122. Memory address space may be orientated towards moving mass quantities of data in that memory write does not require a completion indication before the CPU may move onto other processing tasks. Thus, using memory address space to access storage device 122 provides an advantage over using I/O address space.

To allow CPU 110 to communicate with storage device 122, a set of addresses conventionally may be allocated as an address range within I/O address space for command and control of storage device 122. This range of addresses at which storage device 122 may be accessed is known as a task-file. Under ATA standards, address range 1F0$_{hex}$–1F7$_{hex}$ (or 1F0h–1F7h) is known as the Primary Command Taskfile (PTF) and the address 3F6$_{hex}$ is known as the Primary Control Task File (PCT).

Whenever there may be a need for CPU 110 to write data to or read data from an ATA device, such as storage device 122, CPU 110 may send a series of initialization commands to that ATA device. For example, on receiving the CPU initialization commands, storage device 122 may perform these series of commands to enable itself to transfer the data as requested by CPU 110. Accordingly, each of the nine addresses of this task-file may have a register space into which the CPU may write initialization data. Each task-file register space represents a particular control or command function, whose operation may be based on the numerical data placed at that address.

To initialize storage device 122, CPU 110 may employ software drivers to set up an initialization command. These software drivers write (place) data in each of nine register spaces in a task-file as a series of command addresses (I/O accesses) that form a command packet. CPU 110 conventionally would then send that task-file command packet to the storage device directly through controller 120. On receiving this command packet, storage device 122 would sequentially execute each of the nine address commands, sending a completion message to CPU 110 after each execution.

To reduce the time CPU 110 may dedicate to initializing storage device 122, platform 100 of FIG. 1 may further include register device 128 disposed between CPU 110 and storage device 122. Register device 128 may be disposed between controller 120 and CPU 110 and coupled to system bus 112 through bus 130

Where CPU 110 and controller 120 are not sending and receiving data packages at exactly the same rate (for example, they are not synchronized), register device 128 may include a posting hardware buffer from which items are taken out in the same order they were put in so as to buffer a stream of data between CPU 110 and controller 120. Register device 128 may be a first in/first out (FIFO) device. Register device 128 may be a queue device wherein each entry has a structure. Moreover, register device 128 may have a depth where that depth holds all task-file write instruction packets from CPU 110 without presenting delays due to full conditions. Moreover, the depth of register device 128 may be communicated to task-file write software through readable registers or through a priori to optimize performance.

Commands may be issued to storage device 122 through register device 128 by loading the required registers in a command block with the needed parameters and then writing the command code to a command register. Under the Information Technology—AT Attachment With Packet Interface—5 (ATA/ATAPI-5) (1999) standard at page 133–134, bus 130 may use memory address space having the nine addresses $1F0_{hex}$–$1F7_{hex}$, $3F6_{hex}$ as follows:

TABLE I

READ DIRECT MEMORY ACCESS INPUT COMMANDS

| Address | Register | 7 | 6 | 5 | 4 | 3 | 2 | 1 | 0 |
|---|---|---|---|---|---|---|---|---|---|
| 1F2 | Features | | | | na | | | | |
| 1F3 | Sector Count | | | | Sector count | | | | |
| 1F0 | Sector Number | | | | Sector number or LBA | | | | |
| 1F4 | Cylinder Low | | | | Cylinder low or LBA | | | | |
| 1F5 | Cylinder High | | | | Cylinder high or LBA | | | | |
| 1F6 | Device/Head | obs | LBA | obs | DEV | | Head number or LBA | | |
| 1F7 | Command | | | | Command code C8h | | | | |
| 3F6 | Control | | | | Control code C8h | | | | |

As noted above in Table I, the input command/control codes to read a direct memory access (DMA) device may be C8h. Regarding the remainder register fields, the features register field is not applicable (na) to the direct memory access input command of Table I. The sector count register field indicates the number of sectors to be transferred. For example, a value of 00h indicates that two hundred and fifty six (256) sectors are to be transferred. The sector number register field indicates the starting sector number or the logical block address (LBA) mode address bits (7:0). The cylinder low register field indicates the starting cylinder number bits (7:0) or LBA address bits (15:8). Moreover, the cylinder high register field indicates the starting cylinder number bits (15:8) or LBA address bits (23:16).

For the device/head register field, bit six may be set to one if the LBA logical addressing mode is being used, or cleared to zero if cylinder, head, sector (CHS) physical addressing mode is being used. Bit 7 indicates the starting cylinder number bits (7:0) or LBA address bits (15:8). The use of bit seven and bit five is obsolete (obs). Bit four indicates the selected device (DEV). The remaining bits or the device/head register field, bits three through zero, indicate the head number bit (3:0) or the logical block address (LBA) mode address bits (27:24).

Employing the command register fields of Table I in conjunction with register device 128 may permit software drivers of platform 100 to write the task-file command sequence to a memory-mapped region of controller 120. An advantage of this streamlining task-file access technique is that writing the task-file command sequence to a memory-mapped region (shadow register space) of controller 120 may not block on completion of the transfer of the I/O data to storage device 122 on bus 126. In other words, by using memory writes instead of I/O cycles, CPU 110 employs existing memory write posting infrastructure in controller 120 to complete each write in the minimum number of clock cycles on system bus 112.

By not blocking on completion of the transfer of the I/O data to storage device 122 on bus 126, controller 120 may send the task-file register contents to storage device at a pace that may not be subject to freeing CPU 110 from the initialization of storage device 122. Here, platform 100 may convert the memory writes back to an I/O write format and I/O write rate that may be comprehended by storage device 122. Thus, while the cycle is running on bus 126 (at a much slower rate than posted by CPU 110), CPU 110 may post subsequent task-file memory writes to register device 128 or move onto other processing activities.

Figure 2:
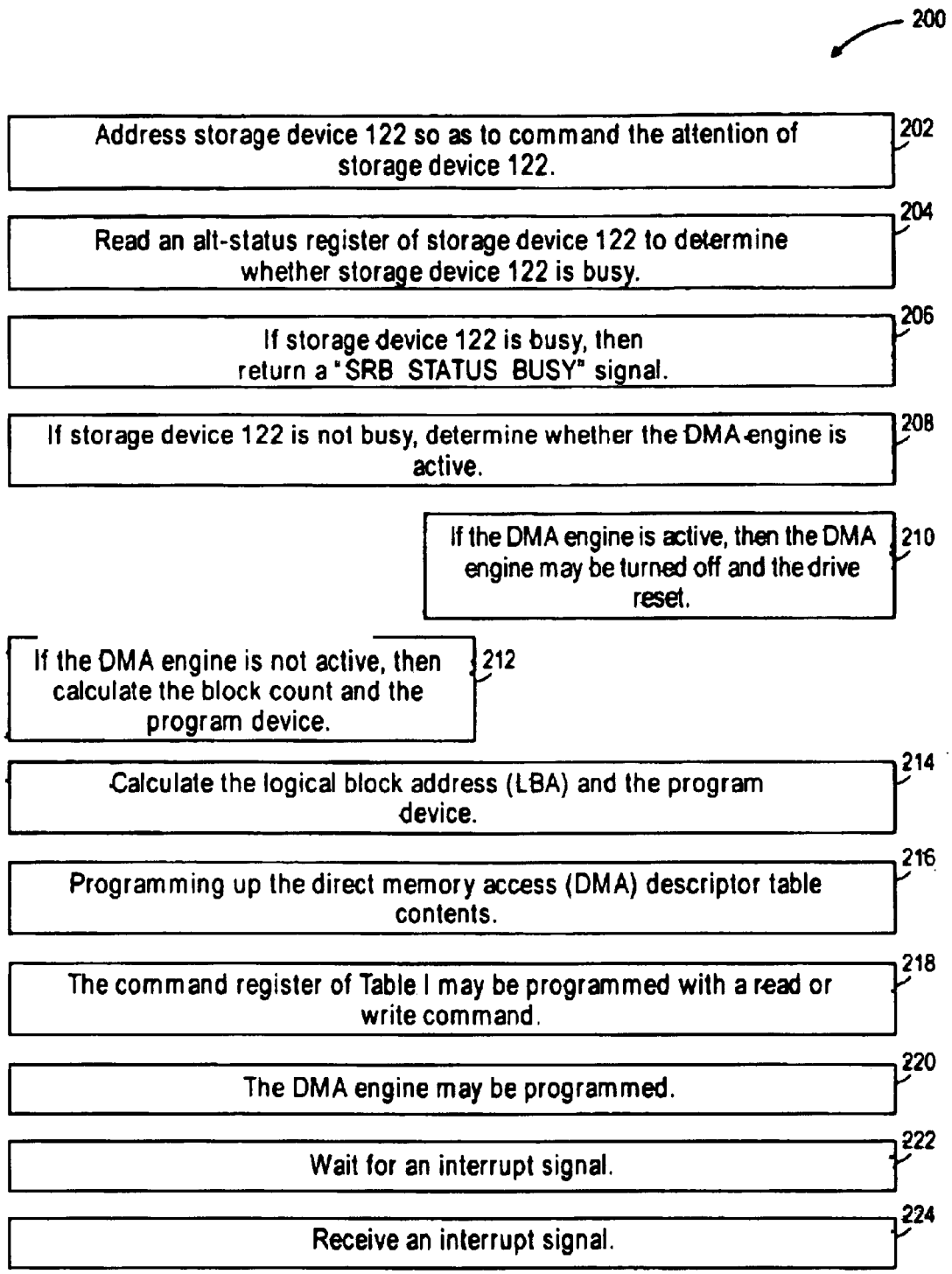
FIG. 2 illustrates read/write command setup protocol method 200.
Figure 3:
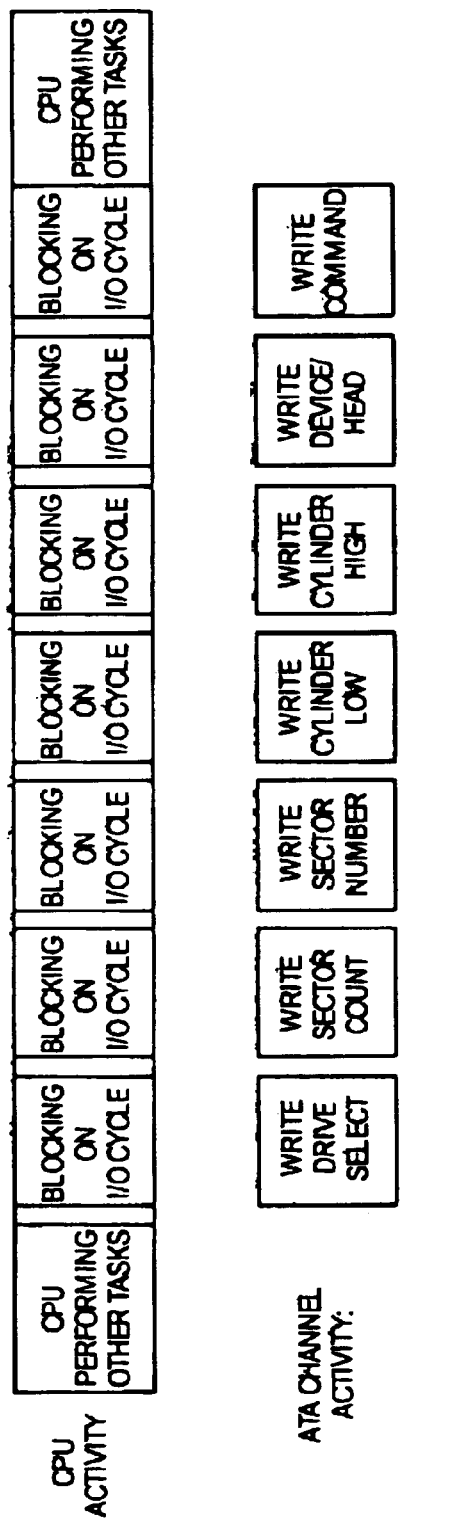
FIG. 3 illustrates a standard input/output (I/O) task-file access.

FIG. 2 illustrates read/write command setup protocol method 200. FIG. 3 illustrates a timeline of the protocol to write task files. As is readily seen, in FIG. 3, while the ATA channel is in an active state, such as writing drive select, the CPU is blocked from performing other tasks.

Method 200 may include similarities to conventional protocols used to write a task-file. However, method 200 involves writing to a memory-mapped register queue rather than I/O mapped task-file registers.

Method 200 may be implemented in any readable medium which, when executed, causes platform 100 of the invention to perform method 200. In one embodiment, method 200 may be implemented through a distributed readable storage medium containing executable computer program instructions which, when executed, cause at least one of a client computer system and a server computer system to perform method 200. Additionally, method 200 may be implemented through a computer readable storage medium containing executable computer program instructions which, when executed, cause a computer system having platform 100 to perform method 200.

Method 200 may begin at step 202. At step 202, method 200 may address storage device 122 so as to command the attention of storage device 122. Recall from Table I above that bit four of the device/head register field indicates the selected device (DEV). Thus, step 202 may include placing the proper input at bit four (the write/drive select bit) of the device/head register field. This bit four information is always sent to the I/O task-file.

At step 204, method 200 may read an alt-status register of storage device 122 to determine whether storage device 122 is busy. If storage device 122 is busy, then method 200 may return a "SRB_STATUS_BUSY" signal at step 206 since the small computer system interface (SCSI) request block (SRB) field would not be clear. From step 206, method 200 may return to step 204.

Under normal operations, storage device 122 may not be busy at the first reading of its alt-status register. Thus, the read command of step 204 may be sent to the I/O task-file. Alternatively, method 200 may return to step 204 up to 20,000 times. Here, the read command of step 204 may be sent to the memory queue.

If storage device 122 is not busy, then method 200 may continue to step 208. At step 208, method 200 may determine whether the DMA engine of storage device 122 is active. If the DMA engine of storage device 122 is active, then the DMA engine may be turned off and the drive reset at step 210. If the DMA engine of storage device 122 is not active, then method 200 may proceed to step 212.

At step 212, method 200 may calculate the block count and the program device. This may involve writing the block length to the memory queue of the sector count register field of Table I. Step 212 is distinguished from conventional techniques in that, under conventional techniques, the block length is written to an I/O task-file whereas step 212 includes writing the block length to the memory queue.

At step 214, method 200 may calculate the logical block address (LBA) and the program device. This may include at least one of writing the following registers of Table I above to the memory queue: sector number, cylinder low, cylinder high, and device/head register. Step 214 is distinguished from conventional techniques in that, under conventional techniques, these registers are written to an I/O task-file whereas step 214 includes writing the registers to the memory queue.

At step 216, method 200 may include programming the DMA descriptor table contents. At step 218, the command register of Table I may be programmed with a read or write command that may be sent to the memory queue rather than an I/O task-file.

At step 220, the DMA engine may be programmed. This may involve clearing the DMA interrupt (BMI) status bit for a specifically-accessed controller, such as controller 120. Additionally, the drive transfer protocol (DTP) of the BM engine may be set. In one embodiment, the BMI_DTP register may be set only once. Last, the BMI control may be set to a "Start/Stop Bus Master" bit.

With the DMA engine programmed at step 220, method 200 may wait for an interrupt signal from storage device 122 at step 222. This may involve returning a "SRB_STATUS_PENDING" signal since the small computer system interface (SCSI) request block (SRB) field would be connected with change. At step 224, an interrupt signal may be received.

The invention may be employed whenever a direct memory access read or write is initiated to an ATA device. Since typical computer systems include a primary hard disk drive that may be enabled for accesses through a direct memory access read or write, CPU performance may improve with each use of this invention. In turn, as CPU performance improves, the disk access overhead that this invention works towards reducing will equate to an ever-large performance gain.

Figure 4:
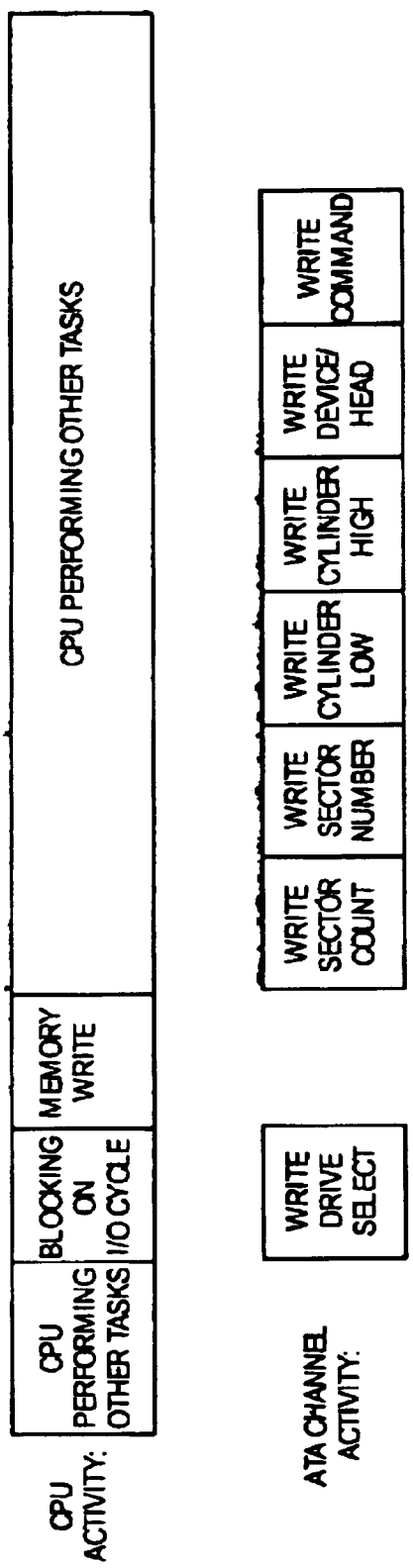
FIG. 4 illustrates an embodiment of the invention streamlining task-file access.

FIG. 4 illustrates a timeline for a method of the invention wherein task-file access is streamlined. By using register device 128, illustrated in FIG. 1, the CPU is freed up to allow processing of other tasks.

The above embodiment can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

The exemplary embodiments described herein are provided merely to illustrate the principles of the invention and should not be construed as limiting the scope of the subject matter of the terms of the claimed invention. The specification and drawings are, accordingly, to be regarded in an illustrative rather than a restrictive sense. Moreover, the principles of the invention may be applied to achieve the advantages described herein and to achieve other advantages or to satisfy other objectives, as well.

What is claimed is:

1. A method comprising:

addressing a storage device coupled to a central processing unit through a controller and a register device, wherein the controller is coupled to the central processing unit through a system bus and the register device is coupled between the central processing unit and the controller, the register device disposed externally to said central processing unit and said controller, said controller having an end that is adapted to receive a device;

writing a block length to a memory queue;

writing content of a plurality of registers to the memory queue;

storing a descriptor command register with one of a read and a write command and transmitting the one of read and write command to the memory queue;

setting values to a plurality of direct memory access bits;

setting a protocol;

waiting for an interrupt signal from the storage device, allowing completion of an input/output (I/O) cycle to the device by using a shadow register space of said controller and said register device during a condition when a task-file register is written and said central processing unit must wait until the I/O cycle out to said task-file register is completed, and receiving said commands by said register device from said central processing unit at a higher rate than said controller receives said commands from said register device.

2. The method of claim 1 wherein loading the descriptor command register includes one of reading and writing to the memory queue.

3. The method of claim 1, wherein the central processing unit is not blocked on completion of transferring input/output data to the storage device as the controller transfers input/output data from the memory queue to the storage device.

4. A machine-accessible medium containing instructions that, when executed, cause a machine to:

address a storage device coupled to a central processing unit through a controller and a register device, wherein the controller is coupled to the central processing unit through a system bus and the register device is coupled between the central processing unit and the controller, the register device disposed externally to said central processing unit and said controller, said controller having an end that is adapted to receive a device;

write a block length to a memory queue;

write content of a plurality of registers to the memory queue;

store a descriptor command register with one of a read and a write command and transmit the one of read and write command to the memory queue;

set values to a plurality of direct memory access bits;

set a protocol;

wait for an interrupt signal from the storage device, allow completion of an input/output (I/O) cycle to the device by using a shadow register space of said controller and said register device during a condition when a task-file register is written and said central processing unit must wait until the I/O cycle out to said task-file register is completed, and receive said commands from said central processing unit by said register device at a higher rate than said controller receives said commands from said register device.

5. The machine-accessible medium of claim 4, wherein storing the descriptor command register further includes one of read from and write to the memory queue.

6. The method of claim 4, wherein the central processing unit is not blocked on completion of transferring input/output data to the storage device as the controller transfers input/output data from the memory queue to the storage device.

* * * * *